United States Patent
Regnier et al.

(10) Patent No.: US 9,886,768 B2
(45) Date of Patent: Feb. 6, 2018

(54) VISUAL TRACKING OF AN OBJECT

(71) Applicant: Universite Pierre et Marie Curie (Paris 6), Paris (FR)

(72) Inventors: Stéphane Regnier, Bois Colombes (FR); Ryad Benosman, Pantin (FR); Cécile Pacoret, Paris (FR); Ieng Siohoi, Montreuil (FR); Ni Zhenjiang, Maisons Alfort (FR)

(73) Assignee: Universite Pierre et Marie Curie, Paris ( * ) Notice: Subject to any disclaimer, the term of this patent is extended or adjusted under 35 U.S.C. 154(b) by 0 days.

(21) Appl. No.: 14/786,577

(22) PCT Filed: Apr. 25, 2014

(86) PCT No.: PCT/EP2014/058423
§ 371 (c)(1),
(2) Date: Oct. 23, 2015

(87) PCT Pub. No.: WO2014/174061
PCT Pub. Date: Oct. 30, 2014

(65) Prior Publication Data
US 2016/0086344 A1    Mar. 24, 2016

(30) Foreign Application Priority Data
Apr. 26, 2013    (FR) ...................... 13 53838

(51) Int. Cl.
*G06K 9/00*    (2006.01)
*G06T 7/20*    (2017.01)
(Continued)

(52) U.S. Cl.
CPC .............. *G06T 7/20* (2013.01); *G06K 9/6218* (2013.01); *G06T 7/254* (2017.01); *G06T 7/277* (2017.01);
(Continued)

(58) Field of Classification Search
None
See application file for complete search history.

(56) References Cited

U.S. PATENT DOCUMENTS

| 6,766,035 B1 * | 7/2004 | Gutta | G06K 9/0057 348/E7.079 |
| 2008/0008354 A1 * | 1/2008 | Milbert | F41G 3/02 382/103 |

(Continued)

FOREIGN PATENT DOCUMENTS

EP    1 164 537 A2    12/2001

OTHER PUBLICATIONS

F. Gomez-Rodriguez et al., "AER image filtering" Proc. of SPIE, vol. 6592, 2007.
(Continued)

*Primary Examiner* — Vikkram Bali
(74) *Attorney, Agent, or Firm* — Pearne and Gordon LLP

(57) ABSTRACT

Method for visual tracking of at least one object represented by a cluster of points with which information is associated, characterized in that it includes steps to: receive (E1) data representing a set of space-time events, determine (E2) the probability that an event in the set belongs to the cluster of points representing the at least one object, for each event in the received set, determine (E3) whether or not an event belongs to the cluster of points as a function of the determined probability for the event considered, for each event in the received set, update (E4) information associated with the cluster of points for at least one object, for each event for which it was determined in the previous step that it belongs to the cluster of points, calculate (E4, E5) the position, size and orientation of the at least one object as a function of the updated information.

8 Claims, 2 Drawing Sheets

(51) Int. Cl.
*G06K 9/62* (2006.01)
*G06T 7/77* (2017.01)
*G06T 7/254* (2017.01)
*G06T 7/277* (2017.01)

(52) U.S. Cl.
CPC ............ *G06T 7/77* (2017.01); *G06T 2200/28* (2013.01); *G06T 2207/30108* (2013.01)

(56) References Cited

U.S. PATENT DOCUMENTS

| | | | | |
|---|---|---|---|---|
| 2008/0232688 | A1* | 9/2008 | Senior | G01S 3/7864 382/181 |
| 2010/0156407 | A1* | 6/2010 | Lausch | G01V 8/10 324/259 |
| 2011/0044537 | A1* | 2/2011 | Cobb | G06K 9/00771 382/165 |
| 2011/0052002 | A1* | 3/2011 | Cobb | G06K 9/00771 382/103 |
| 2012/0200494 | A1* | 8/2012 | Perski | G06F 3/017 345/156 |

OTHER PUBLICATIONS

Matthias Hofstetter, "Temporal Pattern-Based Active Marker Identification and Tracking Using a Dynamic Vision Sensor" Master Thesis, Jan. 2012.

Ewa Piatkowska et al., "Spatiotemporal Multiple Persons Tracking Using Dynamic Vision Sensor" Computer Vision and Pattern Recognition Workshops, IEEE, Jun. 2012.

Rafael Serrano-Gotarredona et al., "CAVIAR: A 45K Neuron, 5M Synapse, 12G Connects/s AER Hardware Sensory-Processing-Learning-Actuating System for High-Speed Visual Object Recognition and Tracking" IEEE Transactions on Neural Networks, vol. 20, No. 9. Sep. 2009.

Search Report issued in French Patent Application No. FR 13 53838 dated Jan. 21, 2014.

International Search Report issued in Application No. PCT/EP2014/058423 dated Jul. 1, 2014.

Written Opinion issued in Application No. PCT/EP2014/058423 dated Jul. 1, 2014.

* cited by examiner

VISUAL TRACKING OF AN OBJECT

TECHNICAL DOMAIN

This invention relates to visual tracking of an object, and more particularly tracking of objects at high speed in real time.

Object tracking has applications in many fields such as video surveillance, traffic monitoring, movement analysis, enhanced reality, robotics and man-machine interfaces.

Object tracking at high speed in real time, typically at a frequency of more than 1 kHz, is applicable more particularly to micro-robotics, the study of the behaviour of micro-organisms and haptics.

STATE OF PRIOR ART

Data acquisition from a conventional camera can be very fast, of the order of several tens of kilohertzs, but repetition of similar information in successive images limits the processing speed of this information. Therefore, the quantity of information processed has to be limited. In practice, this results in limitations such as sub-sampling of the image or reducing the field of the image.

Furthermore, processing must be very simple and is often implemented by hardware rather than software.

The document <<Spatiotemporal multiple persons tracking using dynamic vision sensor>> by Piatkowska, Belbachir and Gelautz, Computer vision and pattern recognition workshops, 2012 IEEE Computer society conference on, IEEE, discloses tracking of a person using an address-event representation. The disclosed method collects events and updates data every 10 ms. Therefore, it is not fast enough to provide satisfactory results.

PRESENTATION OF THE INVENTION

The invention is aimed at solving problems in prior art by providing a method for visual tracking of at least one object represented by a cluster of points with which information is associated, characterised in that it includes steps to:
  receive data representing a set of space-time events;
  determine the probability that an event in the set belongs to the cluster of points representing the at least one object, for each event in the received set;
  determine whether or not an event belongs to the cluster of points as a function of the determined probability for the event considered, for each event in the received set;
  update information associated with the cluster of points for the at least one object, for each event for which it was determined in the previous step that it belongs to the cluster of points;
  calculate the position, size and orientation of the at least one object as a function of the updated information.

With the invention, visual tracking of an object is possible at high speed and without reduction of the field, in other words on the entire field. Object tracking is robust.

The invention does not require any event minimisation or accumulation procedure. The process is purely event-based.

The invention is used to detect and track an object in an unstructured scene.

The invention is capable of simultaneously tracking several objects moving in a single scene. In this case, tracking remains very fast because the chosen shape functions are updated by event and independently of each other.

The invention is applicable in two dimensions or in three dimensions.

According to one preferred characteristic, the set of space-time events is provided by an asynchronous sensor. This type of sensor provides data in the form of events, eliminates information redundancy, with a lower latency time and higher temporal dynamics than conventional sensors.

According to one preferred characteristic, the determination of whether or not an event belongs to the cluster of points includes a comparison of the determined probability for the considered event with a predetermined threshold. Calculations to be done are simple and provide a result quickly.

According to one preferred characteristic, the size and orientation of the at least one object are calculated by modelling the object by an ellipse and calculating its half axes and its orientation. Once again, calculations are simple, fast and provide a precise result.

According to one preferred characteristic, the method also comprises determination of the speed of the at least one object.

According to one preferred characteristic, the reception, determination, update and calculation steps are carried out iteratively.

According to one preferred characteristic, the method also comprises the step to display data representing the position, size and orientation of the at least one object calculated as a function of the updated information.

The invention also relates to a device for visual tracking of at least one object represented by a cluster of points associated with information, characterised in that it comprises:
  means of receiving data representing a set of space-time events;
  means of determining the probability that an event in the set belongs to the cluster of points representing the at least one object, for each event in the set received by the reception means;
  means of determining whether or not an event belongs to the cluster of points as a function of the probability determined for the event considered, for each event in the set received by the reception means;
  means of updating information associated with the cluster of points for the at least one object, for each event for which it has been determined that it belongs to the cluster of points;
  means of calculating the position, size and orientation of the at least one object depending on the updated information.

The device has advantages similar to those mentioned above.

In one particular embodiment, the steps in the method according to the invention are implemented by computer program instructions.

Consequently, the invention applies to a computer program on an information medium, this program possibly being used in a computer, this program including instructions that can implement the steps in a method like that described above.

This program may use any programming language and it may be in the form of a source code, object code, or a code intermediate between a source code and an object code, such as in a partially compiled form or any other desirable form.

The invention also relates to an information medium that can be read by a computer, and that includes computer program instructions suitable for implementation of steps in a method like that described above.

The information medium may be any entity or device capable of storing the program. For example, the medium may include a storage means such as a ROM, for example a CD ROM or a microelectronic circuit ROM, or also a magnetic recording means, for example a diskette or a hard disk.

Moreover, the information medium may be a transmittable medium such as an electrical or optical signal, that may be transported through an electrical or optical cable, by radio or by other means. The program according to the invention may in particular be downloaded on an Internet type network.

Alternately, the information medium may be an integrated circuit in which the program is built in, the circuit being adapted to run or to be used in implementing the method according to the invention.

BRIEF DESCRIPTION OF THE DRAWINGS

Other characteristics and advantages will become clear after reading the following description of a preferred embodiment given as a non-limitative example described with reference to the figures in which.

DETAILED PRESENTATION OF PARTICULAR EMBODIMENTS

Figure 1:
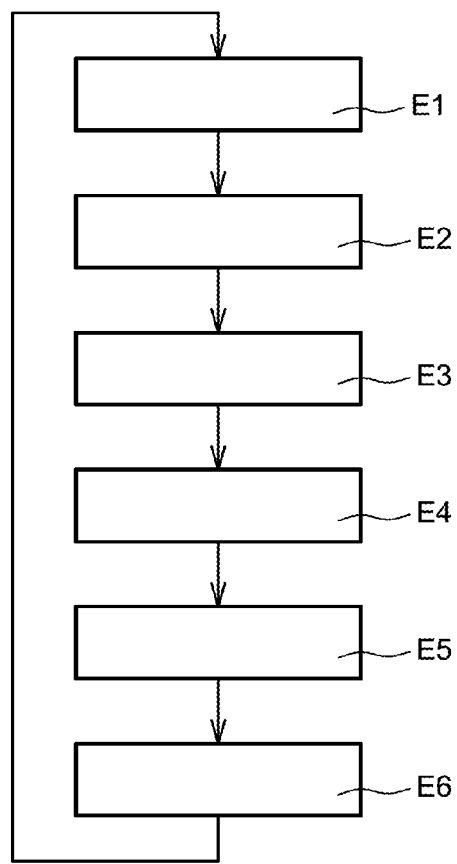
FIG. 1 shows a method for visual tracking of at least one object according to an embodiment of this invention.

According to one preferred embodiment shown in FIG. 1, the method for visual tracking of at least one object comprises steps E1 to E6.

Step E1 is reception of data representing a set of space-time events.

These data are provided by an asynchronous sensor. This type of sensor is capable of acquiring information related to at least one physical magnitude for example such as light, an electric field, or a magnetic field. The asynchronous sensor provides data in the form of events, eliminating information redundancy, with lower latency time and higher temporal dynamics than conventional sensors.

An asynchronous sensor outputs a signal that is not sampled in time at a predefined clock frequency, like the clock of frames in a conventional video signal. An asynchronous sensor provides an Address-Event Representation (AER), of a scene to be displayed. Each pixel corresponds to an event-based signal sequence depending on variations in the light intensity corresponding to this pixel. For example, the event-based asynchronous signal sequence for a pixel comprises a sequence of positive or negative pulses positioned in time as a function of variations of at least one physical magnitude such as light concerning the pixel.

Figure 2:
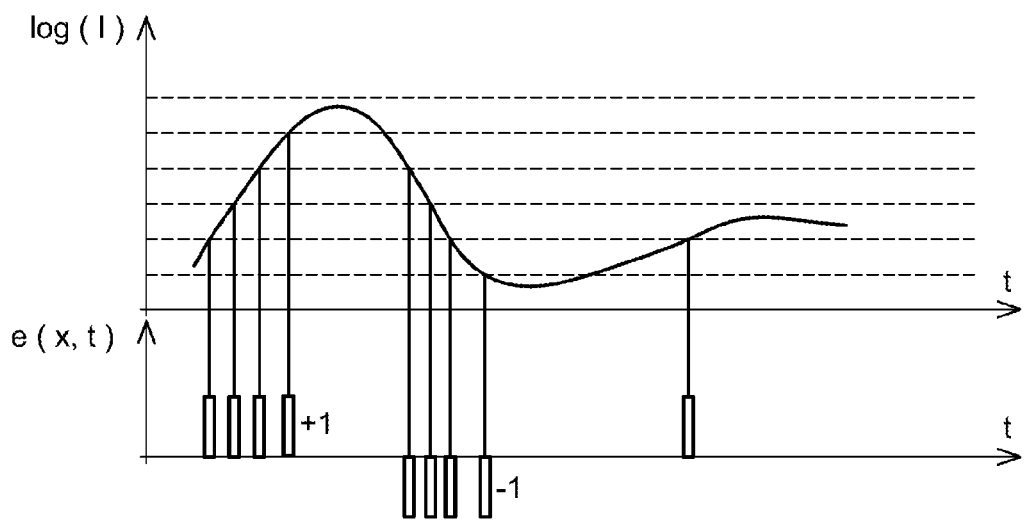
FIG. 2 shows a signal output by an asynchronous sensor used in an embodiment of this invention.
Figure 3:
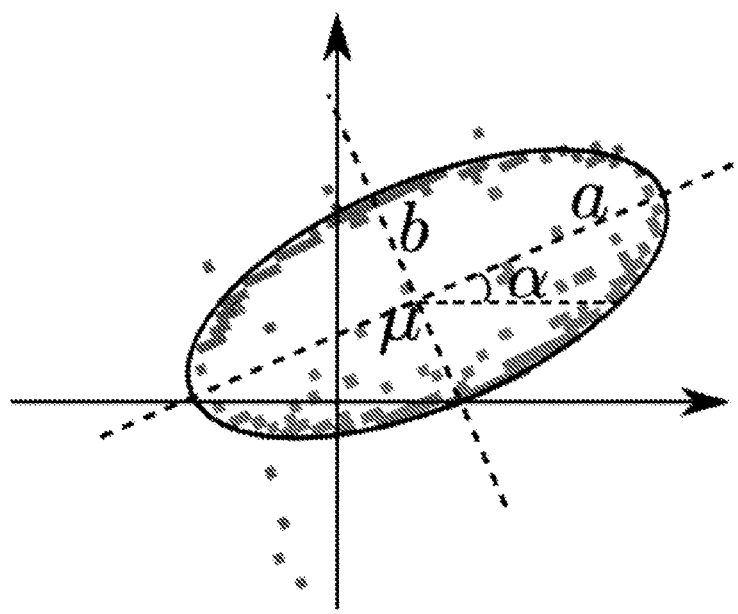
FIG. 3 shows the model of an object according to an embodiment of this invention.

As shown in FIG. 2, for each pixel considered independently, the sensor detects a change in the logarithmic intensity greater than a threshold relative to the intensity related to the previous event. When such a change is detected, a +1 or −1 event is generated depending on whether the logarithmic intensity increases or decreases.

Since the sensor is asynchronous, events may be provided at a very fine time resolution, for example 1 μs.

A time is associated with each event. Thus, an event is mathematically represented by e(x,t), where x is a vector of coordinates representing the position of the event in a space coordinate system and t represents the time of the event.

The value e(x,t) is equal to +1 or −1, as described above.

It is assumed that data representing at least one object are available. These data are in the form of a cluster of points in which each point is an event as defined above.

It should be noted that data representing at least one object are initialized by using a set of Gaussian trackers to mesh the focal plane.

As will be described later, the cluster of points of an object with index i may be modelled by a two-dimensional Gaussian distribution for which the mean $\mu_i(t)$ gives the position of the object in a coordinate system and the covariance matrix $\Sigma_i(t)$ relates to its size and position.

The next step E2 determines the probability that an event in the set received in step E1 belongs to a cluster of points representing an object, for each event in the received set.

The $i^{th}$ object associated with the $i^{th}$ cluster of points is considered, for which the mean $\mu_i(t)=[\mu_{i1}, \mu_{i2}]^T$ is a vector that represents the position of the object at time t in a given two-dimensional coordinate system, index 1 being assigned to the abscissa axis and index 2 being assigned to the ordinate axis. The position of the object is the position of the centre of an ellipse modelling this object.

The covariance matrix $\Sigma_i(t)$ of the ith cluster of points is equal to:

$$\Sigma_i(t) = \begin{bmatrix} \sigma_1^2 & \sigma_{12} \\ \sigma_{12} & \sigma_2^2 \end{bmatrix}$$

The probability that an event e(x,t) in the set belongs to the $i^{th}$ cluster of points is equal to:

$$p_i(x)=(2\cdot\pi)^{-1}|\Sigma_i(t)|^{-1/2}e^{-1/2(x-\mu_i(t))^T\Sigma_i^{-1}(x-\mu_i(t))}$$

In this expression, the vector $x=[x_1,x_2]^T$ is the position at time t of the event considered in the same two-dimensional coordinate system and $|\Sigma_i(t)|$ is the determinant of the covariance matrix.

The probability $p_i(x)$ is calculated for all events occurring at a given time t at which one or more events e(x,t) are produced by the asynchronous sensor, and for all objects. One probability $p_i(x)$ is calculated at a given time t for each object-event pair at this time.

The next step E3 determines whether or not an event belongs to the cluster of points as a function of the determined probability, for each event for which a probability $p_i(x)$ was calculated in the previous step.

To achieve this, the probability $p_i(x)$ is compared with a predetermined threshold S that depends on the lighting. The threshold S is a probability that is for example equal to 2.5%.

If the probability $p_i(x)$ is less than the threshold S, then the event e(x,t) does not belong to the object considered.

If the probability $p_i(x)$ is greater than the threshold S, then the event e(x,t) belongs to the object considered. If several probabilities calculated for the event e(x,t) are greater than the threshold S, then the event e(x,t) belongs to the object with the highest probability.

The next step E4 is to update information associated with the cluster of points for the at least one object, when it was determined in the previous step that at least one event belongs to the cluster of points considered.

Gains or weighting coefficients, $\alpha_1$, $\alpha_2$ and $\alpha_3$ are considered. At time t, for a given object, the position $\mu_i(t)$ of the object is updated as a function of the position at time (t−1) of this object and the event e(x,t) that was determined in step E3 as belonging to the cluster of points representing this object:

$$\mu_i(t)=\alpha_1 \cdot \mu_i(t-1)+(1-\alpha_1)\cdot x$$

The covariance matrix $\Sigma_i(t)$ of the cluster of points at considered time t is updated as a function of the covariance matrix $\Sigma_i(t-1)$ at time (t−1):

$$\Sigma_i(t)=\alpha_2 \cdot \Sigma_i(t-1)+(1-\alpha_2)\cdot \Delta\Sigma_i.$$

In this formula, $\Delta\Sigma_i$ is the difference in covariance calculated from the current position $\mu_i(t)$ of the cluster of points and the position of the event e(x,t) that was determined as belonging to the cluster of points in step E3.

$$\Delta\Sigma_i = \begin{bmatrix} (x_1 - \mu_{i1}(t))^2 & (x_1 - \mu_{i1}(t))\cdot(x_2 - \mu_{i2}(t)) \\ (x_1 - \mu_{i1}(t))\cdot(x_2 - \mu_{i2}(t)) & (x_2 - \mu_{i2}(t))^2 \end{bmatrix}$$

According to one variant embodiment, the speed of the cluster of points considered is also determined and updated. This is the speed in the image plane in pixels per second.

At time t, the speed vector $v_i(t)=[v_{i1}(t), v_{i2}(t)]^T$ is determined according to formula:

$$v_i(t)=\alpha_3 \cdot v_i(t-1)+(1-\alpha_3)\cdot(\mu_i(t)-\mu_i(t-1))/\Delta t$$

where $\Delta t$ is the difference between times t and (t−1).

These calculations to determine the position, covariance matrix and possibly the velocity of the cluster of points are repeated for all events that were determined as belonging to the cluster of points in step E3. They are also repeated for each cluster of points for which it was determined that an event belongs to it in step E3.

The next step E5 calculates the size and orientation of the at least one object as a function of the updated information. This calculation is done for all objects for which information was updated in step E4.

The object is modelled by an ellipse. Half-axes a and b and the orientation a of the ellipse are determined as a function of the covariance matrix $\Sigma_i(t)$ calculated in step E4.

First, the two magnitudes $\lambda_{max}$ and $\lambda_{min}$ are determined as follows:

$$\lambda_{max}=1/2\cdot(\sigma_1^2+\sigma_2^2+\sqrt{(\sigma_1^2-\sigma_2^2)^2+4\cdot\sigma_{12}^2})$$

$$\lambda_{min}=1/2\cdot(\sigma_1^2+\sigma_2^2-\sqrt{(\sigma_1^2-\sigma_2^2)^2+4\cdot\sigma_{12}^2})$$

The half-axes a and b and the orientation a of the ellipse are then calculated using the following formulas:

$$a = \sqrt{\lambda_{max}}$$
$$b = \sqrt{\lambda_{min}}$$
$$\alpha = \frac{1}{2}\cdot \arctan\left(\frac{2\cdot\sigma_{12}}{\sigma_2^2 - \sigma_1^2}\right)$$

The next step E6 is a display of the object(s) for which the position, size and orientation were determined, on a display screen. If the processing in the previous steps was done on the data that were modified between times (t−1) and t, the display is preferably a display of all objects, even objects that were not modified by the previous processing.

Step E6 is optional.

It should be noted that object tracking has been disclosed for a two-dimensional system. However, object tracking according to the invention can be done in three dimensions.

This can be done by using a calibration to relate a modification to the size of the Gaussian to the size of the object. Since the size of the object being tracked is known, its depth can be deduced, in other words whether it is moving away from or towards the sensor, based on the variation of the Gaussian parameters.

All processing described above is done iteratively so that the position, size and orientation of an object are calculated and updated as soon as the asynchronous sensor provides data representing a set of space-time events affecting this object.

As has been seen, events are provided by the asynchronous sensor at a very fine time resolution, for example 1 μs. Therefore the frequency of processing disclosed above is more than 1 kHz.

Figure 4:
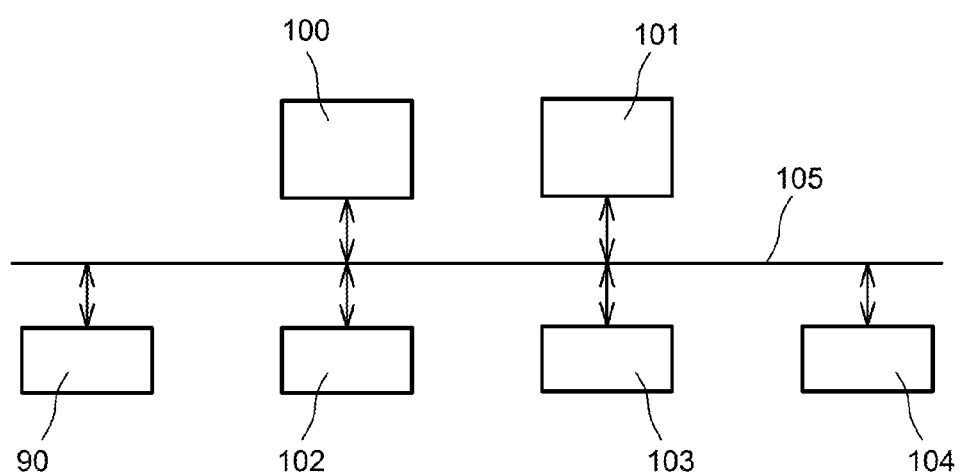
FIG. 4 shows a device for visual tracking of at least one object according to an embodiment of this invention.

FIG. 4 shows a particular embodiment of the device for visual tracking of at least one object, according to the invention.

The device for visual tracking of at least one object represented by a cluster of points with which the information is associated comprises:
  means of receiving data representing a set of space-time events;
  means of determining the probability that an event in the set belongs to the cluster of points representing the at least one object, for each event in the set received by the reception means;
  means of determining whether or not an event belongs to the cluster of points as a function of the determined probability for the event considered;
  means of updating information associated with the cluster of points of the at least one object, when it has been determined that at least one event belongs to the cluster of points;
  means of calculating the position, size and orientation of the at least one object as a function of the updated information.

The device for visual tracking of at least one object has the general structure of a computer. In particular, it comprises a processor 100 running a computer program implementing the method according to the invention, a memory 101, an input interface 102 and an output interface 103.

These different elements are conventionally connected through a bus 105.

The input interface 102 is connected to an asynchronous sensor 90 and it will receive data representing a set of space-time events.

The processor 100 runs the processing described above. This processing is done in the form of code instructions of the computer program stored in memory 101 before they are run by processor 100.

Memory 101 also stores information about clusters of points processed according to the invention.

The output interface 103 is connected to a display screen 104 to display the object.

It should be noted that any type of probability density may be used instead of the Gaussian in the framework of the invention. For example, it could be envisaged to use random distributions and any Gaussian sum and derivative of a Gaussian not limited in the order of the power and the derivative, taking account of all possible orientations.

Potential applications of the invention include optical tweezers, microassembly, microrobotics and remote operation applied at small scales. Similarly, potential applications include fields such as mobile, flying or humanoid robotics, and also particle filtering.

What is claimed is:

1. Method for visual tracking of at least one object represented by a cluster of points with which information is associated, wherein the method includes steps to:
   receive (E1) data representing a set of space-time events from an asynchronous sensor (90);
   determine (E2) the probability that an event in the set belongs to the cluster of points representing the at least one object, for each event in the received set;
   determine (E3) whether or not an event belongs to the cluster of points as a function of the determined probability for the event considered, for each event in the received set;
   update (E4) information associated with the cluster of points for at least one object, for each event for which it was determined in the previous step that it belongs to the cluster of points, a position of the at least one object being updated as a function of the position at a previous time of the at least one object and the event determined at the previous step as belonging to the cluster of points representing the at least one object;
   calculate (E4, E5) the position, size and orientation of the at least one object as a function of the updated information.

2. Method for visual tracking of at least one object according to claim 1, wherein the determination (E3) of whether or not an event belongs to the cluster of points includes a comparison of the determined probability for the considered event with a predetermined threshold.

3. Method for visual tracking of at least one object according to claim 1, wherein size and orientation of the at least one object are calculated (E5) by modelling the object by an ellipse and calculating its half axes and its orientation.

4. Method for visual tracking of at least one object according to claim 1, wherein the method also comprises determination of the speed of the at least one object.

5. Method for visual tracking of at least one object according to claim 1, wherein the reception, determination, update and calculation steps are carried out iteratively.

6. Method for visual tracking of at least one object according to claim 1, wherein the method also comprises the step to display (E6) data representing the position, size and orientation of the at least one object calculated as a function of the updated information.

7. A non-transitory computer readable storage medium comprising instructions for a computer program that, when executed, performs the steps in the method according to claim 1.

8. Device for visual tracking of at least one object represented by a cluster of points associated with information, wherein the device comprises:
   means of receiving data representing a set of space-time events;
   means of determining the probability that an event in the set belongs to the cluster of points representing the at least one object, for each event in the set received by the reception means;
   means of determining whether or not an event belongs to the cluster of points as a function of the probability determined for the event considered, for each event in the set received by the reception means;
   means of updating information associated with the cluster of points for the at least one object, for each event for which it has been determined that it belongs to the cluster of points, a position of the at least one object being updated as a function of the position at a previous time of the at least one object and the event determined at the previous step as belonging to the cluster of points representing the at least one object;
   means of calculating the position, size and orientation of the at least one object depending on the updated information.

* * * * *

UNITED STATES PATENT AND TRADEMARK OFFICE
CERTIFICATE OF CORRECTION

PATENT NO. : 9,886,768 B2  
APPLICATION NO. : 14/786577  
DATED : February 6, 2018  
INVENTOR(S) : Stéphane Regnier et al.

Page 1 of 1

It is certified that error appears in the above-identified patent and that said Letters Patent is hereby corrected as shown below:

In the Specification

Column 5, Line 44, "orientation a" should be -- orientation α --.

Column 5, Line 53, "orientation a" should be -- orientation α --.

Signed and Sealed this  
Twenty-fourth Day of July, 2018

Andrei Iancu  
*Director of the United States Patent and Trademark Office*